J. HARRIS.
MACHINE FOR CUTTING AND WELDING WITH FLUID FUEL.
APPLICATION FILED FEB. 2, 1917.

1,320,687.

Patented Nov. 4, 1919.
5 SHEETS—SHEET 1.

Inventor,
John Harris,
By Hull, Smith, Brock & West
Attys.

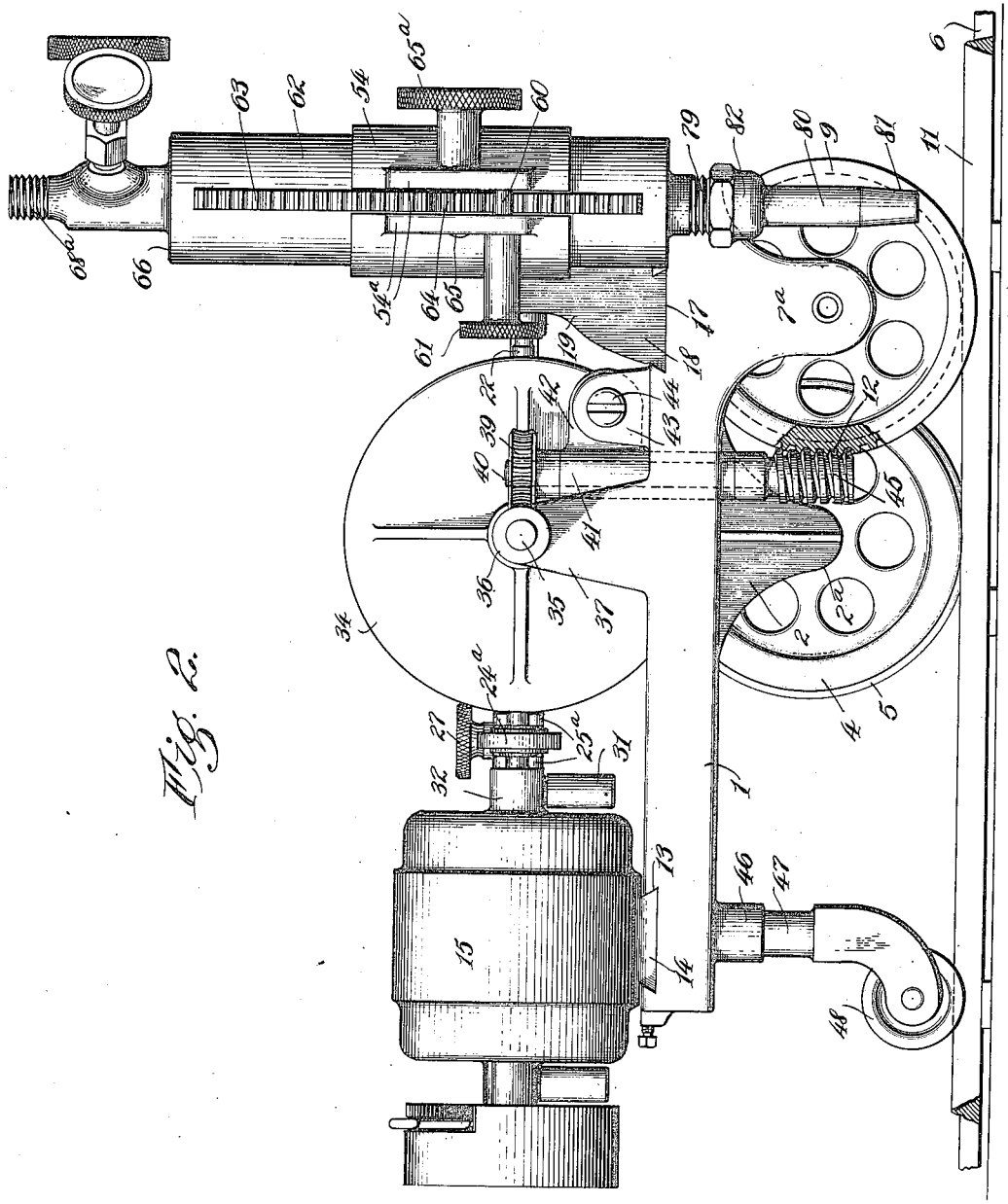

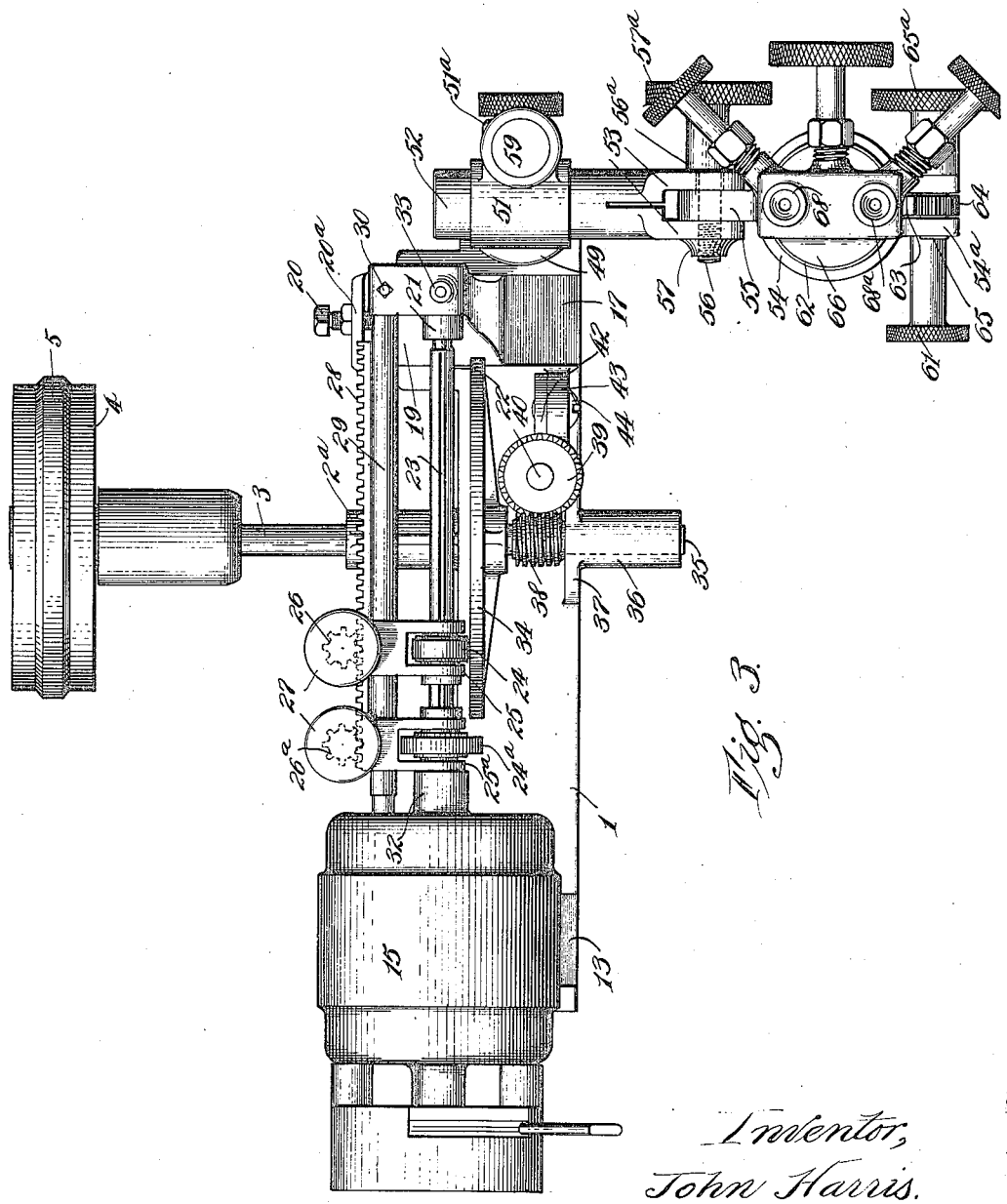

J. HARRIS.
MACHINE FOR CUTTING AND WELDING WITH FLUID FUEL.
APPLICATION FILED FEB. 2, 1917.

1,320,687.

Patented Nov. 4, 1919.
5 SHEETS—SHEET 4.

Inventor,
John Harris,
By Hull, Smith, Brock & West.
Attys.

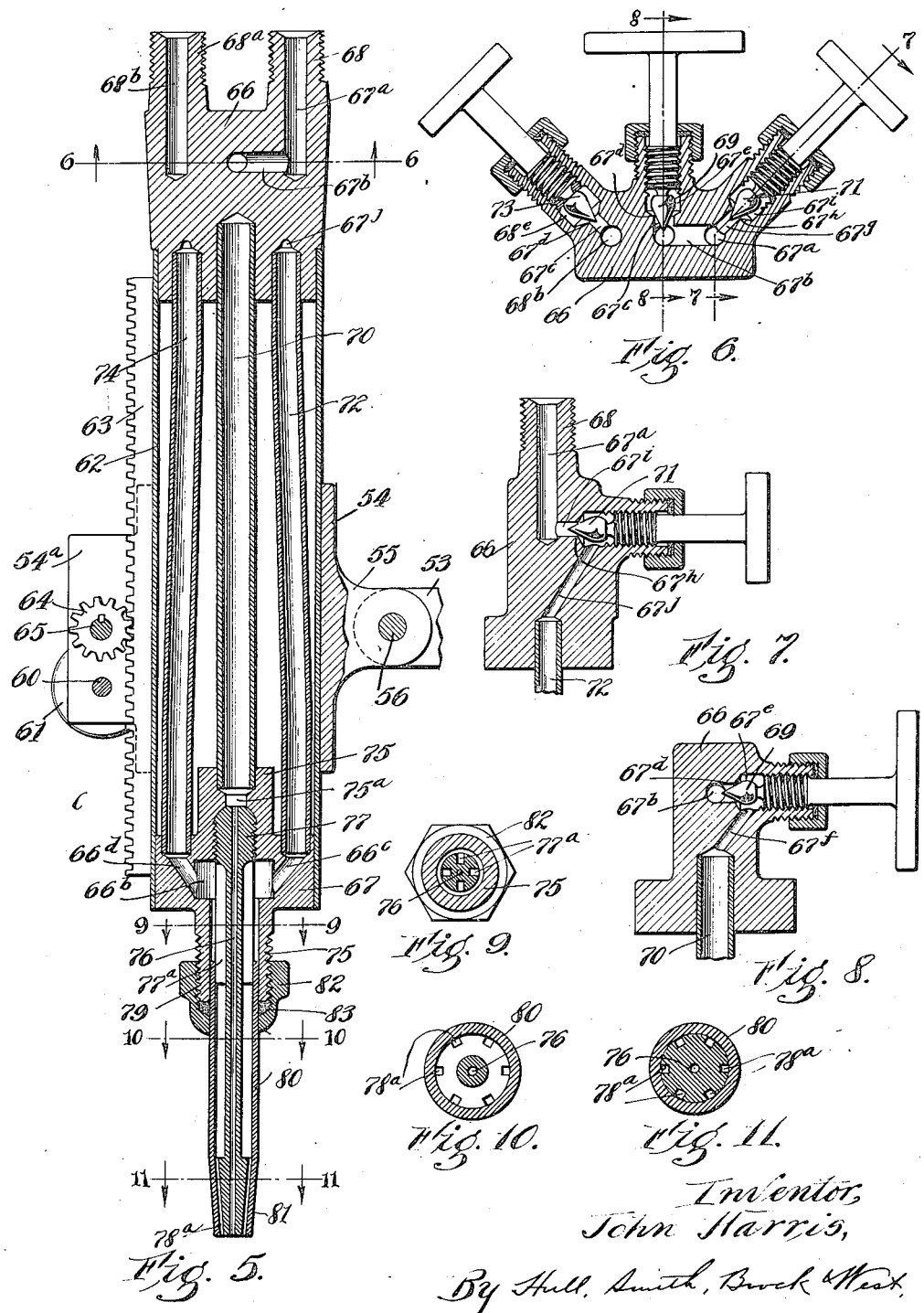

UNITED STATES PATENT OFFICE.

JOHN HARRIS, OF LAKEWOOD, OHIO, ASSIGNOR TO CARBO-HYDROGEN COMPANY OF AMERICA, OF PITTSBURGH, PENNSYLVANIA, A CORPORATION OF DELAWARE.

MACHINE FOR CUTTING AND WELDING WITH FLUID FUEL.

1,320,687.      Specification of Letters Patent.      Patented Nov. 4, 1919.

Application filed February 2, 1917. Serial No. 146,310.

*To all whom it may concern:*

Be it known that I, JOHN HARRIS, a citizen of the United States, residing at Lakewood, in the county of Cuyahoga and State of Ohio, have invented a certain new and useful Improvement in Machines for Cutting and Welding with Fluid Fuel, of which the following is a full, clear, and exact description, reference being had to the accompanying drawings.

This invention relates to machines for cutting and welding with gases. One of the objects of the invention is the provision of a machine of this character with means whereby the speed at which it is moved with reference to the work as well as its direction of drive, or movement, may be conveniently and efficiently reversed; also the provision, in such machines, of means whereby the wear of the operating and driving parts may be taken up or compensated. A further object of the invention is to provide a machine of the character described with means whereby it may be employed for the purpose of curvilinear cutting and welding and whereby the curvature of the arc or circle described by the cutting or welding torch may be varied as occasion may require. A still further object of the invention is to provide a torch which is particularly well adapted for cutting purposes in connection with such a machine. Further and more limited objects of the invention will appear in the body of the specification and will be embodied in the combinations of elements included in the claims attached to and forming part hereof.

Figures 1, 12:
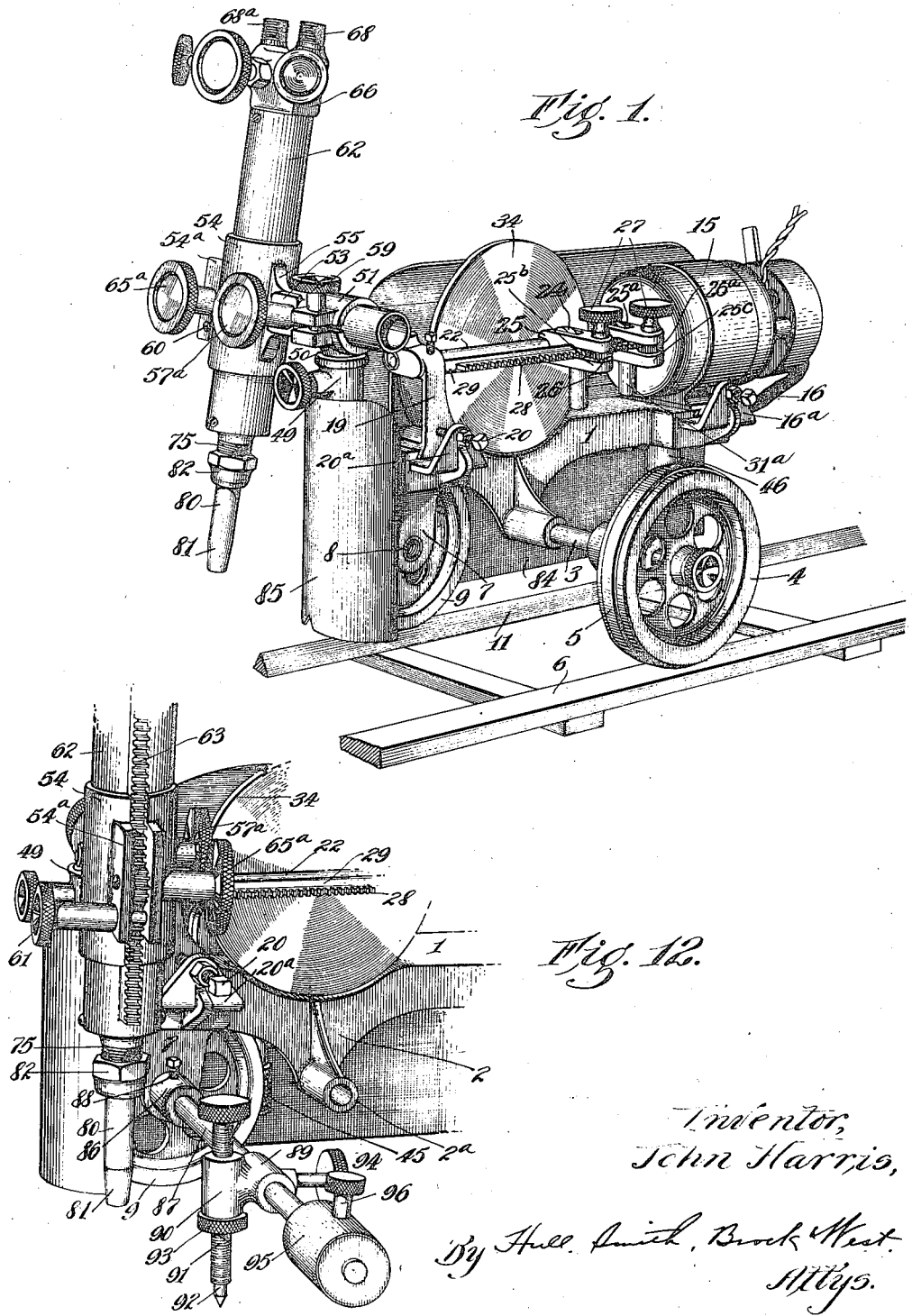

In the drawings, illustrating one embodiment of my invention, Figure 1 represents a perspective view of a machine of the character referred to; Fig. 2 an elevation of such machine taken from the opposite side of Fig. 1, certain parts being broken away; Fig. 3 a plan view, and Fig. 4 a transverse sectional view (with certain parts shown in elevation) of such machine; Fig. 5 a central vertical sectional view taken through the blow pipe or torch forming part of the machine; Fig. 6 a sectional detail corresponding to the line 6—6 of Fig. 5, looking in the direction of the arrows; Figs. 7 and 8 sectional details corresponding respectively to the lines 7—7 and 8—8 on Figs. 5 and 6 and looking in the direction of the arrows; Fig. 9 a sectional detail corresponding to the line 9—9 of Fig. 5, looking in the direction of the arrows; Figs. 10 and 11 enlarged sectional details corresponding respectively to the lines 10—10 and 11—11 of Fig. 5, looking in the direction of the arrows; and Fig. 12 a detail in perspective of the front of the machine shown in Figs. 1 to 4 inclusive and showing the attachment to be employed with said machine when the latter is used for cutting and welding along curvilinear lines.

Describing by reference characters the various parts illustrated herein, 1 denotes generally the carriage frame on which the operating parts are mounted. This carriage frame is provided with a depending bracket 2 supporting a sleeve 2ª which forms a support for a spindle 3 on the outer end whereof there is journaled a wheel 4, the spindle being secured in place by means of a set screw 3ª (see Fig. 4), said wheel being provided with a central circumferential tread 5 which is adapted to coöperate with a rail 6. Near its forward end, the carriage frame is provided with a pair of depending brackets 7 and 7ª which support a hollow spindle 8 for a wheel 9. This wheel (see Fig. 4) is provided at one side thereof with a circumferential recess 10 which is preferably triangular in section and which coöperates with a triangular rail 11. Near its opposite side, the wheel is provided with a worm gear 12, for a purpose to be described hereinafter. Near its rear end, the carriage frame 1 is provided with a transversely extending dovetailed slot 13 in which there is slidably mounted the dovetailed base 14 of a constant-speed electric motor 15, the said motor being transversely adjustable on said frame by means of a set screw 16 threaded into an upwardly projecting bracket 16ª mounted on the carriage frame. Near its front end, the carriage frame 1 is provided with a transverse dovetailed slot 17 forming a guideway for the dovetailed base 18 of a bracket 19, said bracket being transversely adjustable along said slot by means of a set screw 20 threaded into an upwardly projecting bracket 20ª mounted on the carriage frame. The bracket 19 is provided with a journal 21 for the forward end of the motor shaft 22, said shaft being provided with a longitudinal keyway 23 (see Fig. 3) and having slidably keyed thereto a pair of friction wheels 24 and 24ª each journaled between the vertical forks 25, 25ª, respectively, of a yoke, said yoke being slidably mounted at one end on the shaft 22 and being horizontally forked at its opposite end. A pinion 26, 26ª, is mounted between the horizontal forks 25ᵇ and 25ᶜ of the said yokes respectively, said pinion being rigidly connected to a shaft journaled in said branches and having an operating hand wheel 27. This pinion meshes with a rack 28 which is conveniently carried by a rod 29 supported at its front end by the bracket 19 and at its rear end by the motor housing, the bracket 19 being provided with a set screw 30 for securing the rod in place. It will be evident that, by rotating the hand wheel 27, the yoke may be moved along the shaft 22 and rod 29, carrying with it the friction wheel 24. For the purpose of lubricating the shaft 22, cups 31 and 31ª are provided, these cups being carried respectively by the bearing 32 on the motor housing and the yoke. A lubricating cup 33 carried by the bearing 21 is provided for the front end of said shaft.

Figure 4:
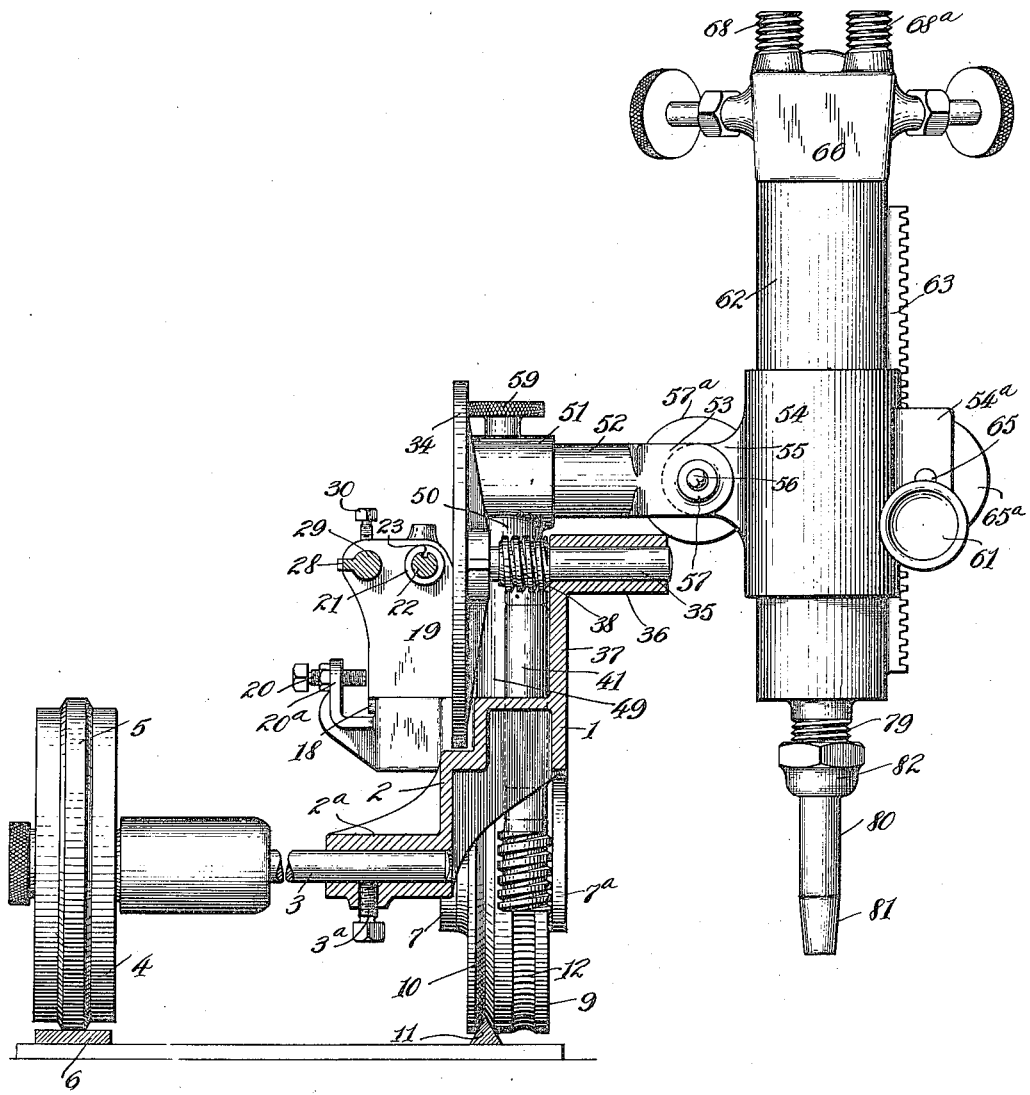

Coöperating with the friction wheel 24 is the friction disk 34, said disk being mounted upon a shaft 35 journaled in a bearing 36 on a bracket 37 projecting upwardly from the carriage frame and having a worm gear 38 thereon meshing with a worm wheel 39 (see Figs. 2, 3 and 4). The axes of the shafts 22 and 35 are in the same plane and are at right angles to each other. The worm wheel 39 is rigid with a shaft 40 which is journaled in a verticle sleeve 41 having a lateral lug or extension 42 pivotally connected to a bracket 43 projecting upwardly from the carriage frame, the journaled sleeve being secured in any adjusted position by means of a clamp screw 44. At its lower end the shaft 40 is provided with a worm 45 meshing with the worm gear 12 on the drive wheel 9. It will be evident that, as the worms and worm gears become worn, compensation for such wear may be readily and conveniently effected by rotating the journal sleeve 41 about its pivot, slacking off and tightening the clamp screw 44 for that purpose.

At its rear end, the carriage frame is provided with a depending sleeve 46 forming a journal for the upper end of the shaft 47 of a caster wheel 48 which is preferably provided with a triangular groove adapted to receive therewith in the triangular rail 11.

49 denotes a vertical journal sleeve on the front of the carriage frame. This sleeve rotatably supports a shaft 50 having at its upper end a split sleeve 51 in which there is adjustably mounted a hollow shaft 52, one end of the hollow shaft being split to provide a pair of forks 53 between which the blow pipe or torch is pivotally supported by means of a sleeve 54 having a lug or projection 55 extending between the forks 53 and secured thereto by means of a bolt 56 which extends through the forks and is threaded into a boss 57 carried by one of them. The bolt 56 is enlarged at the end opposite the threaded portion, as shown at 56ª, and is provided with an operating wheel 57ª. By rotating the bolt in one direction, the projection 55 will be clamped between the forks through the conjoint action of the threaded end of the bolt and the enlarged portion 56ª, and, when rotated in the opposite direction the forks will be allowed to spring apart to permit of the adjustment of the sleeve extension 55 therebetween. The hollow shaft 52 is adjustably mounted in the split sleeve 51 by means of a threaded bolt 58, similar to the bolt 56, and extending through lugs 51ª on the sleeve 51 and having an operating wheel 59.

The sleeve 54 forms a means for adjustably supporting the blow pipe or torch which may be used for the cutting or welding operations. The sleeve forms a split bearing for the blow pipe and is provided with a pair of lugs or extensions 54ª whereby the clamping pressure exerted by the sleeve upon the blow pipe may be varied, as by means of a bolt 60, similar to the bolts 56 and 58, threaded into one of the lugs and having an operating wheel 61—see Figs. 1, 2, 4 and 12.

The blow pipe comprises a tubular body 62 mounted within the sleeve 54 and having a rack 63 projecting between the lugs 54ª. This rack meshes with a pinion 64 on a shaft 65 which is journaled to the lugs 54ª and provided with an operating wheel 65ª.

The blow pipe shown herein is one which is adapted for cutting and welding with oxygen and which is peculiarly well suited for use with the apparatus or machine herein described. The tubular body 62 extends between a pair of blocks 66 and 67, the said blocks having passageways for the gases employed by the blow pipe, there being tubes within the casing extending between said blocks and connecting the passageways thereof. The block 66 is preferably a casting having at its upper end the connection 68 for oxygen and the connection 68ª for combustible gas. The connection 68 and the body of the block 66 are provided with a vertical passageway 67ª through which oxygen is conducted by a passageway 67ᵇ to the central portion of the block 66. From the passageway 67ᵇ there extends a short forwardly projecting passageway 67ᶜ having a valve seat 67ᵈ controlled by a valve 69. When this valve is opened, the oxygen may pass through passageways 67ª, 67ᵇ, and 67ᶜ into a chamber 67ᵉ and thence through a passageway 67ᶠ to the tube 70, whence the oxygen will be delivered to the central jet orifice of the torch.

At its lower end, the passageway 67$^a$ communicates with a forwardly extending passageway 67$^g$ provided with a valve seat 67$^h$ controlled by the valve 71. When this valve is open, oxygen may pass through the passageway 67 into a chamber 67$^i$ and thence through a passageway 67$^j$ into a pipe 72, said pipe serving to conduct oxygen to a chamber in the lower block 67 where it is mingled with combustible gas and thence discharged through the heating orifices of the blow pipe.

The passageway 68$^b$ for combustible gases communicates with the lateral passageway 68$^c$ having a valve seat 68$^d$ controlled by a valve 73. When this valve is open the combustible gas enters a chamber 68$^e$ and thence by means of a passageway identical with the passageway 67$^j$ (and hence not shown in detail) into the pipe 74 the lower end of which communicates with a mixing chamber in the lower block 67 with which the pipe 72 also communicates.

The lower block 67 is also preferably a casting and is provided with a central connection 75 which receives the lower end of the pipe 70 and which is provided with a short passageway or chamber 75$^a$ which communicates with the central bore 76 of an inner tip member, said inner tip member having an externally threaded head 77 at its upper end which is threaded into the upper central portion of the projection 75 beneath the chamber 75$^a$. This inner tip member is provided with two slotted blocks or projections, one of said blocks or projections being in effect a continuation of the head 77 and being of the same diameter as said head and having rectangular slots 77$^a$, four such slots being shown. The other block or projection 78 is at the lower end of such inner tip member and is tapered or frusto conical in shape, being provided with radially extending rectangular slots 78$^a$, six of such slots being shown, and said slots being smaller than the slots 77$^a$.

The lower end of the block 66$^a$ is provided with an externally threaded sleeve 79 which receives wthin its lower end the upper end of the outer tip member 80. The upper end of the outer member is of such diameter as to fit closely about the lower end of the upper slotted body or projection of the inner tip member and to form with its outer surface a close contact with the inner wall of the sleeve 79. The discharge end or nozzle of such member 80 is tapered or frusto conical, as indicated at 81, and forms a close fit with the correspondingly tapered end of the inner tip member. The construction of the tip members shown and described herein forms the subject matter of my application No. 112,223 filed July 31, 1916.

For the purpose of securing the outer tip member in place and to provide a leak-tight connection between said member and the sleeve 79, I apply to the lower end of said sleeve a gland nut 82, there being packing 83 interposed between the gland of said nut and the lower end of the sleeve whereby, as the nut is set up, the packing will be compacted about the joint between the member 80 and the lower end of the sleeve.

The block 67 is provided with a chamber 66$^b$ surrounding the upper end of the inner tip member. The pipes 72 and 74 discharge into said chamber through passageways 66$^c$ and 66$^d$ respectively.

In the operation of the blow pipe, combustible fluid will be supplied to the chamber 66$^b$ through the passageways 68$^a$, 68$^b$, chamber 68$^c$, and the passageway 68$^e$. Oxygen to mingle with such combustible fluid will be supplied to the said chamber by means of the passageways 67$^a$, 67$^c$, the chamber 67$^e$, passageway 67$^f$ and the tube 72. The mixture will flow through the slots 77$^a$ and 78$^a$ and will be ignited at the orifices thereby to preheat the metal (where the metal is to be cut). When the metal has been heated to the desired extent, oxygen for cutting purposes may be supplied through the central passageway 76 of the tip through the passageways 67$^a$, 67$^b$, 67$^g$, the chamber 67$^i$, passageway 67$^j$ and tube 70.

In order to protect the carriage frame and the parts thereof from the molten metal and the heat incident to the operation of the torch, I provide copper shields 84 and 85.

The construction thus far described will merely enable the apparatus to perform straight line cutting and welding. When it is desired to perform curvilinear cutting and welding, the wheel 4 and the rod 3 are removed, and a sleeve 86 is threaded into the hollow spindle 8. A rod 87 having a pivot thereon is inserted into the bushing 86 and is secured in place by means of a set screw 88. 89 denotes a sleeve which is adjustably mounted upon the rod 87 and which carries a vertically extending sleeve 90 in which there is adjustably mounted a bolt 91 having the pivot point 92 thereon. This bolt is threaded into the sleeve 90 and is secured in its vertically adjusted positions by the lock nut 93. A set screw 94 extending through the sleeve 89 secures the latter and the pivot bolt at any desired distance from the blowpipe and the wheel 9.

When it is desired to use the apparatus for cutting and welding along circular lines, the machine is placed upon the work (the rails of course not being employed) and, because of the adjustability of the pivot 92 along the rod 87 and the adjustability of the torch toward and from said pivot about the sleeve 49 as a center, it will be evident that arcs or cycles of exceedingly varying radius or diameter may be cut. For instance, the pivot and the torch may be placed in such juxtaposition as to enable circles of one inch radius to be cut or welded while, by swinging the torch to the opposite side of the sleeve 49 and by adjusting the pivot, an arc or circle having a very large radius may be cut or welded; in fact, the rod 87 may be made of any desired length, with a correspondingly wide variation in adjustment for the pivot.

It will be observed that the rod 87 is shown as provided with a counterweight 95 which may be adjustably connected to said rod by means of a set screw 96. This counterweight may be applied when the torch is swung to the opposite side of the carriage from that shown in Fig. 12 and is for the purpose of counterbalancing the weight of such torch.

Among the important advantages of my invention are the following:—

(a) I am enabled to employ a constant speed motor and to obtain therefrom any rate of drive of the cutting or welding torch that may be desired and to accomplish this result in an extremely simple and convenient manner—by moving the friction wheel 24 toward or from the center of the disk 34. In all other machines of the character with which I am familiar, it has been found necessary to use a rheostat for varying the speed of the motor as well as to change the gear ratio. By my apparatus, it is possible to predetermine the rate of speed at which the carriage and pipe will travel; but, should a change of speed be necessary or desirable after the cutting or welding operation has once been started, this change can be effected in a most convenient manner.

(b) The drive of the carriage is reversible—by merely moving the friction wheel across the center of the friction disk, and this reversal is accomplished without reversing the motor.

(c) The friction between the friction wheel and its disk may be maintained at the point of maximum efficiency.

(d) Effective and convenient means are provided for compensating for the wear and tear on the driving connections between the motor shaft and the drive wheel.

(e) If desirable, each machine may be provided with a set of interchangeable friction wheels so as to adapt them for various kinds of work. For instance, a small friction wheel driven at high speed will enable the machine to perform rapid cutting, with a suitable range of adjustment for such work; the employment of a large friction wheel will enable the machine to be employed upon a slower class of work and with a wide range of adjustment. This arrangement is shown more particularly in Figs. 1, 3 and 12 wherein the friction wheel 24$^a$ is shown as of larger diameter than the friction wheel 24. When desired to operate with the wheel 24, the yoke for the wheel 24$^a$ will be moved out of operative relation to the friction disk and the parts will be so adjusted that the wheel 24 will coöperate with such disk. When it is desired to use the larger wheel 24$^a$, the motor, together with its shaft and the attached parts, may be so adjusted, through the brackets and slideways described hereinbefore, to enable the wheel 24$^a$ to coöperate with the disk, the wheel 24 and its yoke in such case being moved to the left or front ends of the motor shaft and rack, where said yoke and wheel 24 will not interfere with the operation of the wheel 24$^a$.

Having thus described my invention, what I claim is:—

1. In a machine of the character described, the combination of a carriage having a drive wheel and one or more wheels additional thereto for supporting the carriage in operative relation to the work, a torch or blow pipe supported on said carriage, a constant speed electric motor on said carriage, a shaft for said motor, and a variable speed friction drive interposed between the motor shaft and the drive wheel.

2. In a machine of the character described, the combination of a carriage having a drive wheel and one or more wheels additional thereto for supporting the carriage in operative relation to the work, a constant speed motor on said carriage, a shaft for said motor, a torch or blow pipe supported by said carriage, and a variable speed connection interposed between the motor shaft and the drive wheel whereby the carriage may be propelled at varying speeds notwithstanding the constant speed of the motor shaft.

3. In a machine of the character described, the combination of a carriage having a drive wheel and one or more wheels additional thereto for supporting the carriage in operative relation to the work, a constant speed motor on said carriage, a shaft for said motor, a torch or blowpipe supported by said carriage, and driving means interposed between said shaft and said drive wheel, said driving means including a friction disk and a friction wheel one of which friction elements is mounted on said shaft, and means for moving one of such friction elements with reference to the other whereby the carriage may be driven at varying speeds notwithstanding the constant speed of the motor shaft.

4. In a machine of the character described, the combination of a carriage, a motor thereon, a drive wheel and one or more wheels additional thereto for said carriage, a torch or blow pipe supported by said carriage, a shaft for said motor, a friction wheel on said shaft, a friction disk on said carriage, driving connections between said disk and said drive wheel, means for moving the friction wheel along said shaft and across the face of the disk, and means whereby the motor and its shaft may be adjusted toward the friction disk thereby to regulate the driving friction between the wheel and the disk.

5. In a machine of the character described, the combination of a carriage, a torch supported thereby, a motor on said carriage, a drive wheel and one or more wheels additional thereto for said carriage, a shaft for said motor, and driving connections between said shaft and said drive wheel, said connections comprising a friction wheel on the motor shaft and movable therealong, a friction disk on the carriage, a shaft for said disk, a worm on said shaft, a shaft having at one end thereof a worm gear meshing with said worm and at its opposite end a worm, a worm gear on the drive wheel meshing with the last-mentioned worm, and means pivotally supporting the last mentioned shaft.

6. In a machine of the character described, the combination of a carriage, a torch supported thereby, a motor on said carriage, a shaft for said motor, a drive wheel and one or more wheels additional thereto for said carriage, and means for driving said drive wheel from said shaft, said means comprising a friction driving member on the motor shaft, a second friction member on the carriage, one of said members being adjustable with reference to the other thereby to vary the speed of the driven friction member, a shaft on the second friction member, a gear on said shaft, a shaft having a gear meshing with the last mentioned gear and a gear meshing with a gear on the drive wheel, a journal for the last mentioned shaft, and a support to which said journal is pivotally connected whereby the last mentioned shaft may be adjusted about said pivot to compensate for the wear of the gears transmitting movement from the second friction member to the drive wheel.

7. In a machine of the character described, the combination of a carriage, a torch supported thereby, a motor on said carriage, a shaft for said motor, a drive wheel and one or more wheels additional thereto for said carriage, and means for driving said drive wheel from said shaft, said means comprising a shaft driven by the motor shaft, a gear on the second shaft, a third shaft having a gear driven by the last mentioned gear and a gear for operating said drive wheel, and means pivotally supporting said third shaft.

8. In a machine of the character described, the combination of a carriage, a torch supported thereby, a constant speed motor on said carriage, a drive wheel and one or more wheels additional thereto for said carriage, a shaft for said motor, and means for operating said drive wheel at varying speeds from said shaft, said means comprising a friction disk on said carriage, a driving connection between said disk and said wheel, a friction wheel slidably keyed upon said shaft, a rod extending parallel with said shaft, a rack on said rod, a yoke slidably mounted upon said shaft and rod and adapted to move the friction wheel along said shaft and toward, from, and across the axis of rotation of said disk, a pinion carried by said yoke and meshing with said rack, and means for rotating said pinion.

9. In a machine of the character described, the combination of a carriage, a torch supported thereby, a motor on said carriage, a shaft for said motor, a drive wheel for said carriage, a friction disk mounted on said carriage, driving connections between said disk and said wheel, a friction wheel slidable along the motor shaft toward, from, and across the axis of rotation of the said disk, said carriage having slideways extending transversely with respect to said shaft, supporting members for said motor and shaft mounted in said slideways, and means for adjusting said members thereby to regulate the driving friction between said wheel and disk.

10. In a machine of the character described, the combination of a carriage, a torch supported thereby, a motor on said carriage, a shaft for said motor, a drive wheel and one or more wheels additional thereto for said carriage having, said drive wheel a seat in the tread thereof for a rail and provided with a worm gear, and driving connections between said shaft and said drive wheel, said driving connections including a shaft having a worm meshing with said worm gear.

11. In a machine of the character described, the combination of a carriage, a motor thereon, a drive wheel for said carriage, driving connections between said motor and said wheel, a pivot bar adapted to be connected to and extend axially from said wheel, a pivot adjustably mounted on said bar, and a torch mounted on the carriage and adjustable toward and away from said pivot.

12. In a machine of the character described, the combination of a carriage, a motor supported thereby, a drive wheel, driving connections between said motor and said wheel, a rod adapted to be applied to and extend axially from said wheel, a pivot adjustably mounted upon said rod, a torch, a horizontally extending supporting arm for said torch, a vertical journal, and a shaft rotatable in said journal to which the said horizontal arm is adjustably connected.

13. In a machine of the character described, the combination of a carriage, a motor thereon, a shaft for said motor, a drive wheel and one or more wheels additional thereto, and connections for driving said drive wheel from said shaft, said connections including a friction disk on the carriage, a friction wheel slidably keyed upon the shaft, and means for adjusting said wheel toward, from, and across the axis of said disk, said means comprising a rack bar, a pinion meshing with said bar, means for rotating said pinion, and connections between the pinion and the friction wheel whereby the latter will be moved along the motor shaft through the operation of the hand wheel.

14. In a machine of the character described, the combination of a carriage, a motor thereon, a shaft for said motor, a torch or blow pipe supported by said carriage, a drive wheel for said carriage, a friction disk on said carriage, a pair of friction wheels of varying diameters slidably mounted on said motor shaft and each movable across the face of said disk, means for moving either of said wheels along said shaft, driving connections between said disk and said driving wheel, and means whereby the motor shaft may be adjusted toward and from said disk.

15. In a machine of the character described, the combination of a carriage, a motor thereon, a shaft for said motor, a torch or blow pipe supported by said carriage, a drive wheel for said carriage, and driving means interposed between said shaft and said wheel, said driving means including a friction disk and a pair of friction wheels, and means whereby either of said wheels may be placed in operative relation to said disk.

16. In a machine of the character described, the combination of a carriage, a torch or blow pipe supported thereby, a motor on said carriage, a shaft for said motor, a drive wheel for said carriage having a V shaped groove in the tread thereof for a correspondingly shaped rail and provided with a worm gear, and driving connections between said shaft and said wheel, said driving connections including a shaft having a worm meshing with said worm gear.

In testimony whereof, I hereunto affix my signature.

JOHN HARRIS.